Sept. 29, 1959        F. NICHOLS        2,906,435
AIR PRESSURE ACTUATED BEER DISPENSER AND COIL CLEANER
Filed July 26, 1955        2 Sheets-Sheet 1
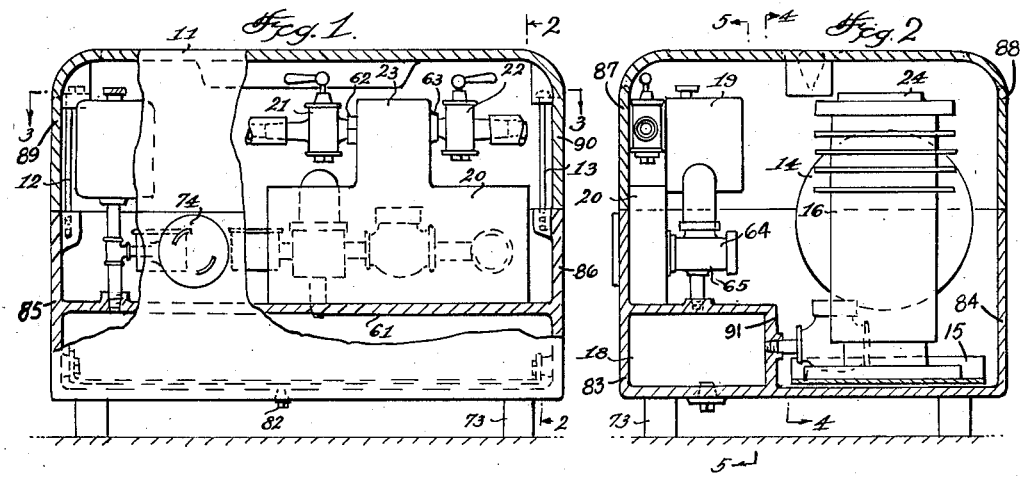
INVENTOR.
FRANK NICHOLS
BY *Victor J. Evans & Co.*
ATTORNEYS Sept. 29, 1959 F. NICHOLS 2,906,435
AIR PRESSURE ACTUATED BEER DISPENSER AND COIL CLEANER
Filed July 26, 1955 2 Sheets-Sheet 2
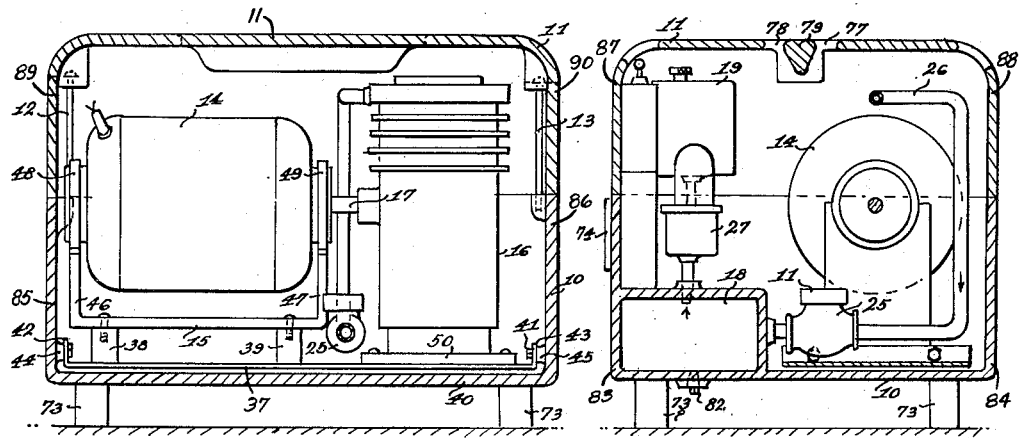
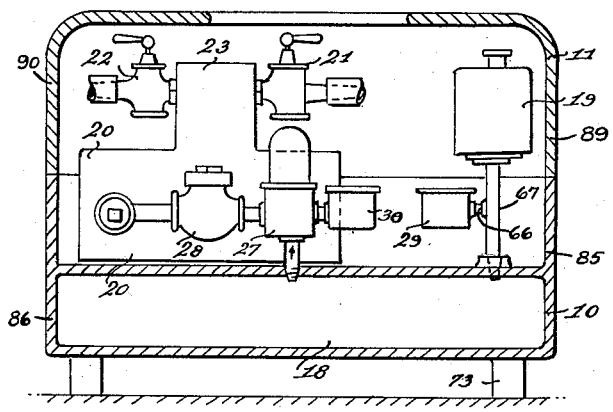
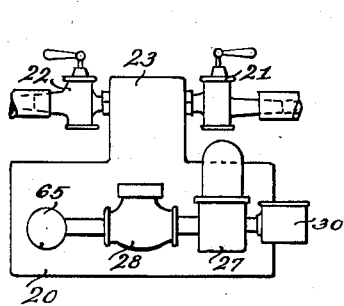
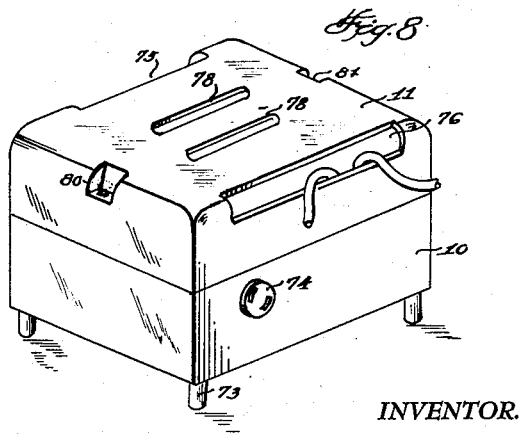
INVENTOR.
FRANK NICHOLS
BY *Victor J. Evans & Co.*
ATTORNEYS

United States Patent Office 2,906,435
Patented Sept. 29, 1959

2,906,435

AIR PRESSURE ACTUATED BEER DISPENSER AND COIL CLEANER

Frank Nichols, San Antonio, Tex., assignor of one-fourth to Ralph Trejo, one-fourth to Curtis W. Brown, and one-fourth to Peter Briola, all of San Antonio, Tex.

Application July 26, 1955, Serial No. 524,348

1 Claim. (Cl. 222—25)

This invention relates to beer dispensing apparatus in which beer is on tap continuously, and in particular, beer dispensing apparatus where beer is supplied from kegs or other containers to cooling coils and taps by filtered air under pressure continuously and in which the coils are cleaned by a detergent suspended in water and wherein the moisture is removed by air under pressure.

The purpose of this invention is to provide beer dispensing apparatus in which all foreign tastes or flavors due to leakage of oil, gases, and the like into the system are eliminated.

With the conventional beer dispensing apparatus, gas is used as the pressure producing agent and the gas is not only costly, but it is difficult to prevent oil and other foreign products mixing with the beer. With this thought in mind, this invention contemplates a sanitary beer pump and coil cleaner that is oil free, is not subject to leakage, and that will not taint the beer.

The object of this invention is, therefore, to provide a beer dispenser in which pressure is produced by an air compressor wherein with air from the compressor filtered only clean dry air contacts the beer.

Another object of the invention is to provide pressure means for feeding beer from supply containers to coils and taps in which the operator is assured that flat or wild beer will not be delivered from the tap.

A further object of the invention is to provide an improved beer dispenser in which the beer is supplied from containers to coils and taps by air pressure in which the same apparatus is adapted to clean the coils with compressed air, water and a detergent.

A still further object of the invention is to provide an improved beer pump and coil cleaner in which air is used as the pressure agent in which the device is of a simple and economical construction.

With these and other objects and advantages in view, the invention embodies a beer pump or dispenser and coil cleaning unit including a motor driven compressor, a compressed air storage tank having a pressure regulator with pressure gauges thereon, and connected to the compressor through a filter, a main filter connected to the pressure regulator through a filter and also connected to kegs or supply containers, and a coil cleaner or mixing tank connected to the filter and also having connections to a water supply and to beer cooling and dispensing coils.

Other features and advantages of the invention will appear from the following description, taken in connection with the drawings, wherein:

Figure 1 is a front elevational view with part of the housing broken away showing the intake filter with shut-off cocks thereon and a pressure switch.

Figure 2 is a cross section through a beer dispensing unit taken on line 2—2 of Figure 1 showing the compressor, air storage tank and one of the shut-off cocks.

Figure 3 is a plan view of the unit taken on line 3—3 of Figure 1 showing the relative positions of the elements in the housing.

Figure 4 is a longitudinal section through the housing taken on line 4—4 of Figure 2 showing the motor and compressor assembly.

Figure 5 is a longitudinal section through the housing taken on line 5—5 of Figure 2 showing the air storage tank pressure regulator and filter with the cut-off valves or cocks.

Figure 6 is a cross section through the housing taken on line 6—6 of Figure 3 also showing the motor, air storage tank and one of the filters.

Figure 7 is a view showing an assembly of the air storage tank with the shut-off cocks and filter body positioned thereon.

Figure 8 is a perspective view showing the exterior of the housing of the unit.

Figure 9 is a diagrammatic view illustrating the relative positions of the parts and showing pipes and tubes connecting the elements.

Referring now to the drawings, wherein like reference characters denote corresponding parts, the improved beer dispenser and coil cleaner of this invention includes a housing having a base 10 with a cover 11, the cover being secured to the base with elongated screws 12 and 13, a motor 14 positioned on a platform 15, an air compressor 16 driven by the motor through a shaft 17, a cavity providing a sealed compressed air storage tank or chamber 18 in the lower section or base 10 of the housing, a pressure switch 19 also positioned in the housing, a main filter 20 positioned on the air storage chamber or tank 18, shut-off cocks 21 and 22 positioned at the sides of an upper section 23 of the filter, an intake filter 24 positioned above the compressor 16, a filter 25 in a connection 26 from the compressor to the air storage tank 18, a pressure regulator 27 positioned on the air storage tank, a filter 28 between the pressure regulator and the filter 20, a pressure gage 29 for the air storage tank 18, a pressure gage 30 for the system connected to the pressure regulator, and suitable connections between beer kegs or containers 31, a coil cleaner or mixing tank 32 and a coil 33, the coil cleaner 32 being connected to a water main 34 with a tube 35 and the tube 35 having a valve 36 therein. The platform 15 upon which the motor 14 is mounted is spaced above a panel 37 with blocks 38 and 39 and, as shown in Figure 4, the panel is spaced above the base 40 of the lower section 10 of the housing being supported with bolts 41 extended through flanges 42 and 43 at the ends of the panel. The bolts extend through the flanges and are threaded in lugs 44 and 45 on the inner surfaces of end sections of the lower portion of the housing. The platform 15 is provided with upwardly extended ends 46 and 47 and the motor housing is secured in rings 48 and 49 on upper portions of the ends 46 and 47. A base 50 of the compressor is also secured to the panel 38 with fasteners, such as bolts 51.

Air is drawn into the compressor 16 through the intake filter 24 and from the compressor air is discharged through the connection or tube 26 to the filter 25 and from the filter 25 the air passes through a tube 52 to the compressed air storage chamber 18. From the compressed air storage chamber 18 air passes through a connection 53 to the pressure regulator 27 and from the pressure regulator air passes through a connection 54 to the filter 28 from which the air passes through a connection 55 to the filter 20. From one side of the upper section 23 of the filter, the air passes through a tube 56 in which the shut-off cock 21 is positioned to the kegs or containers 31, the air forcing the fluid in the containers back through the connections and part 23 of the filter, and from the filter through a tube 57 in which the shut-off valve 22 is positioned, to the coil cleaner 32, the tube 57 having a valve 58 therein. The coil cleaner 32 is connected to the water main 34 with the tube 35 and to the coil 33 through a connection 59, the connection being provided with a valve 60.

The filter 20 is positioned upon an upper panel 61 of the compressed air storage chamber and the shut-off cocks 21 and 22 are threaded into bosses 62 and 63 on the sides of the section 23 of the filter 20.

The body of the filter 28 is threaded into a branch connection 64 of a T 65 on one side of the filter. The pressure regulator 27 is provided with a gage 30 to indicate the pressure of fluid in the system beyond the air storage tank, and the tank is provided with the pressure gage 29 that is connected, by a tube 66 which extends from a tube 67 connecting the pressure switch 19 to the tank.

The pressure switch 19 is connected in the motor circuit with wires 67 and 68 and to line power as indicated by the wires 69 and 70 with wires 71 and 72.

The housing or casing in which the elements are installed may be provided in different patterns or designs and, particularly as illustrated in Figure 8, the lower portion of the case, which is supported on legs or lugs 73, is provided with a socket 74 for a plug of an electric cord or the like.

The cover 11 is provided with elongated openings 75 and 76 through which tubes or pipes extend from the elements to beer kegs or containers and to the coil and tap, slots 77 and 78 positioned on opposite sides of a rib 79, providing a handle and recesses 80 and 81 in which the bolts 12 and 13 are positioned. The lower part of the lower section 10 is also provided with a drain plug 82 by which condensation or oil that may leak into the system may be drained from the tank.

The base 10 of the housing is provided with upwardly disposed side walls 83 and 84 and end walls 85 and 86, and the cover 11 includes depending side walls 87 and 88 and end walls 89 and 90, the lower edges of the side and ends walls of the cover being in meeting relation with upper edges of the side and end walls of the base. The upper panel 61, which is spaced upwardly above the base and which is integral with the lower portion of the housing extends from the side wall 83 and between the end walls 85 and 86. The edge of the upper panel opposite to the edge connected to the wall 83 is connected to the base by a partition 91 providing a sealed compressed air storage chamber integral with the base and side and end walls thereof.

It will be understood that modifications, within the scope of the appended claim, may be made in the design and arrangement of the parts without departing from the spirit of the invention.

What is claimed is:

In a beer dispenser and coil cleaner, the combination which comprises a housing including a lower portion having a base with upwardly extended side and end walls, and an upper portion or cover having a top panel with depending side and end walls, the lower edges of the side and end walls of the cover being in meeting relation with corresponding upper edges of the side and end walls of the base, a horizontally disposed upper panel spaced above the base and extended from the side wall on one side of the lower portion of the housing to a point intermediate of the width of the housing, a vertically disposed partition extended from the base to the edge of the panel at the point intermediate of the width of the housing, said horizontally disposed panel and vertically disposed partition coacting with adjacent parts of the side and end walls of the base of the housing to provide a cavity and said cavity providing a sealed compressed air storage chamber, a platform mounted on said end walls of the lower portion of the housing and spaced upwardly from the base thereof, a motor positioned on the base and mounted on said platform, a compressor positioned on the base and mounted on said platform, means operatively connecting the compressor to the motor, the compressor having a suction and a discharge, a filter positioned in the suction of the compressor, the upper horizontally disposed panel of the compressed air storage chamber having openings therein, a tube having a filter therein connecting the discharge of the compressor to an opening in the partition of the compressed air storage chamber, a pressure regulator mounted in another opening of the upper panel of the compressed air storage chamber, a pressure gauge mounted on said pressure regulator, a main filter mounted on the upper panel of the compressed air storage chamber, a connection having a filter therein extended from the pressure regulator to the main filter, a connection from the main filter to beer kegs, a coil cleaner, a connection from the main filter to the coil cleaner, a connection from the coil cleaner to beer coils, a connection from the coil cleaner to a water supply, a pressure switch tube mounted in another opening of the upper panel of the compressed air storage chamber, a pressure switch connected to said pressure switch tube and positioned to be actuated by pressure of air in the compressed air storage chamber, a gage mounted on said pressure switch tube, and circuits connecting the motor to the pressure switch and the pressure switch to a source of current supply.

References Cited in the file of this patent

UNITED STATES PATENTS

| | | |
|---|---|---|
| 1,915,123 | Downs | June 20, 1933 |
| 2,055,334 | Bukoski et al. | Sept. 22, 1936 |
| 2,339,082 | Kromer | Jan. 11, 1944 |
| 2,458,230 | Warcup | Jan. 4, 1949 |
| 2,563,385 | Warcup | Aug. 7, 1951 |